United States Patent
Hiro

(10) Patent No.: US 11,825,047 B2
(45) Date of Patent: Nov. 21, 2023

(54) PAPER CONVEYANCE DEVICE, IMAGE READING APPARATUS, COMPUTER-READABLE STORAGE MEDIUM STORING CONTROL PROGRAM AND CONTROL METHOD FOR PAPER CONVEYANCE DEVICE

(71) Applicant: SHARP KABUSHIKI KAISHA, Sakai (JP)

(72) Inventor: Hideyuki Hiro, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/380,739

(22) Filed: Jul. 20, 2021

(65) Prior Publication Data

US 2022/0060590 A1 Feb. 24, 2022

(30) Foreign Application Priority Data

Aug. 20, 2020 (JP) ................. 2020-139076

(51) Int. Cl.
*H04N 1/04* (2006.01)
*H04N 1/00* (2006.01)

(52) U.S. Cl.
CPC ......... *H04N 1/0057* (2013.01); *H04N 1/0071* (2013.01); *H04N 1/00702* (2013.01); *H04N 1/00716* (2013.01); *H04N 1/00721* (2013.01); *H04N 1/00777* (2013.01); *H04N 1/00795* (2013.01); *H04N 2201/0094* (2013.01)

(58) Field of Classification Search
CPC ............ H04N 1/0057; H04N 1/00702; H04N 1/0071; H04N 1/00716; H04N 1/00721; H04N 1/00777; H04N 1/00795; H04N 2201/0094
USPC ................................ 358/1.12, 488, 498, 496
See application file for complete search history.

(56) References Cited

U.S. PATENT DOCUMENTS

| 9,197,775 B2 | 11/2015 | Koda et al. | |
| 2014/0209653 A1* | 7/2014 | Kikuchi | B65H 23/0204 226/15 |

FOREIGN PATENT DOCUMENTS

JP 2015-162724 A 9/2015

* cited by examiner

*Primary Examiner* — Cheukfan Lee
(74) *Attorney, Agent, or Firm* — ScienBiziP, P.C.

(57) ABSTRACT

According to an automatic document feeder of a multifunction peripheral according to the present invention, two tilt sensors are provided in the middle of a document conveyance path to detect a tilt degree of a document being conveyed along the document conveyance path. Here, for example, if the positional deviation representing the tilt degree of the document is greater than a predetermined threshold value ΔLs, the conveyance of the document is stopped. On the other hand, if this is not the case, the conveyance of the document is continued. In addition, the threshold value is set in accordance with the width dimension of the document, and in particular, the larger the width dimension, the smaller the threshold value.

8 Claims, 10 Drawing Sheets

| DOCUMENT SIZE | La [mm] | ΔLmax [mm] | θ [°] | ΔLd [mm] |
|---|---|---|---|---|
| A5R | 148 | 7.0 | 2.71 | 6.6 |
| B5R | 182 | 7.0 | 2.20 | 5.3 |
| A4R/A5 | 210 | 7.0 | 1.91 | 4.6 |
| B4/B5 | 257 | 7.0 | 1.56 | 3.8 |
| A3/A4 | 297 | 7.0 | 1.35 | 3.2 |

FIG. 10

| La' [mm] | ΔLs [mm] |
|---|---|
| <153 | 6.6 |
| <187 | 5.3 |
| <215 | 4.6 |
| <262 | 3.8 |
| ≥262 | 3.2 |

PAPER CONVEYANCE DEVICE, IMAGE READING APPARATUS, COMPUTER-READABLE STORAGE MEDIUM STORING CONTROL PROGRAM AND CONTROL METHOD FOR PAPER CONVEYANCE DEVICE

BACKGROUND OF THE INVENTION

Field of the Invention

The present invention relates to a paper conveyance device, an image reading apparatus, a computer-readable storage medium storing control program and a control method for a paper conveyance device, and in particular to a paper conveyance device, an image reading apparatus, and a computer-readable storage medium storing control program and a control method for a paper conveyance device, in which paper placed on a placement section is taken into a conveyance path in units of one sheet and conveyed along the conveyance path.

Description of the Background Art

An example of this type of technique is disclosed in Japanese Unexamined Patent Application Publication No. 2015-162724. According to the technique disclosed in this Japanese Unexamined Patent Application Publication No. 2015-162724, in an image reading apparatus capable of performing tilt correction conforming to the posture of a document, the posture of the document being conveyed along a conveyance path is detected. Then, when the detected posture of the document is tilted more than a predetermined first threshold value, the tilt of the document is corrected. On the other hand, if the tilt of the document is less than the first threshold value, the tilt of the document is not corrected. Furthermore, for a long document whose dimension in the document conveyance direction is larger than a predetermined dimension, a second threshold value representing a smaller tilt amount than the first threshold value is applied as an alternative to the first threshold value.

When the tilt degree of the document being conveyed in the conveyance path is excessively large, the document may be damaged by being caught on the side edges of the conveyance path. In order to avoid this, it is desirable to stop the conveyance of the document when the tilt degree of the document is excessively large. In such case, even if the document has the same tilt degree, the larger the document dimension, especially the dimension in the direction perpendicular to the conveyance direction, so-called width dimension, the greater the possibility that the document will be caught on the side edges of the conveyance path. On the other hand, if the width dimension of the document is relatively small, even if the document is tilted slightly, the document is unlikely to be caught on the side edges of the conveyance path. Consequently, it is essential to ensure that the document is conveyed efficiently without being stopped unnecessarily, while avoiding damage to the document by the document being caught on the side edges of the conveyance path.

Accordingly, it is an object of the present invention to provide, in a paper conveyance device that conveys paper such as a document along a conveyance path, an image reading apparatus including the paper conveyance device, and a computer-readable storage medium storing control program and a control method for the paper conveyance device, a new technique that can ensure that the paper is not damaged due to being caught on the side edge of a conveyance path, and that the paper is conveyed efficiently without being unnecessarily stopped.

SUMMARY OF THE INVENTION

In order to achieve this object, the present invention includes a first aspect according to a paper conveyance device, a second aspect according to an image reading apparatus including the paper conveyance device, a third aspect according to a computer-readable storage medium storing control program for the paper conveyance device, and a fourth aspect according to a control method for the paper conveyance device.

The first aspect according to a paper conveyance device is a paper conveyance device that takes in paper placed on a placement section into a conveyance path in units of one sheet and conveys the paper along the conveyance path, and includes a width dimension detector, a tilt degree detector, a stopper, and a threshold value setter. The width dimension detector detects a width dimension, which is a dimension of the paper in a direction perpendicular to a conveyance direction of the paper placed on the placement section. The tilt degree detector detects a tilt degree of the paper being conveyed along the conveyance path, with respect to a basic posture of the paper. The stopper stops conveyance of the paper when a result of detection by the tilt degree detector, that is, a tilt degree of the paper being conveyed, exceeds a threshold value. In addition, the threshold value setter sets the threshold value on a basis of a result of detection by the width dimension detector, that is, on a basis of the width dimension of the paper, and strictly speaking, sets the threshold value at least before the tilt degree detector detects the tilt degree of the paper.

In the first aspect of the present invention, a size detector may be further provided. The size detector detects a size of the paper placed on the placement section. In this case, the width dimension detector may detect the width dimension of the paper on the basis of a result of detection by the size detector, that is, on the basis of the size of the paper.

Moreover, in the first aspect of the present invention, a regulator and a regulated position detector may be further provided. The regulator regulates positions of both side edges of the paper in the direction perpendicular to the conveyance direction of the paper placed on the placement section, for example mechanically (physically). Then, the regulated position detector detects the positions regulated by the regulator, that is, the positions of both side edges of the paper in the direction perpendicular to the paper conveyance direction. In this case, the width dimension detector may detect the width dimension of the paper on the basis of a result of detection by the regulated position detector, that is, on the basis of the positions of both side edges of the paper in the direction perpendicular to the paper conveyance direction.

Additionally, in the first aspect of the present invention, a user operation acceptor may be further provided. The user operation acceptor accepts a user operation indicating that the paper is thin paper. In this case, it is desirable for the threshold value setter to set the threshold value on the basis of whether the user operation has been accepted by the user operation acceptor, that is whether the paper is thin paper, in addition to the result of detection by the width dimension detector.

Apart from this, in the first aspect of the present invention, a thickness detector may be further provided. The thickness detector detects a thickness of the paper, strictly speaking, at least before the tilt degree detector detects the tilt degree of the paper. In this case, it is desirable for the threshold value setter to set the threshold value on the basis of a result of detection by the thickness detector, that is a thickness of the paper, in addition to the result of detection by the width dimension detector.

The paper in the first aspect of the present invention may be, for example, a document. In addition, an image reading position for an image reader to read an image of the document may be arranged in a middle of the conveyance path. In other words, the first aspect of the present invention may be applied to a so-called document feeder that feeds a document to an image reading position for the image reader in units of one sheet.

An image reading apparatus according to the second aspect of the present invention includes the paper conveyance device according to the first aspect of the present invention, and strictly speaking, includes the paper conveyance device as a document feeder. In addition, the image reading apparatus according to the second aspect of the present invention includes an image reader.

A computer-readable storage medium storing control program for a paper conveyance device according to the third aspect of the present invention causes a computer of the paper conveyance device to perform a width dimension detection procedure, a tilt degree detection procedure, a stop procedure, and a threshold value setting procedure. Here, the paper conveyance device is a device that takes in paper placed on a placement section into a conveyance path in units of one sheet and conveys the paper along the conveyance path. On that basis, the width dimension detection procedure detects a width dimension which is a dimension of the paper in a direction perpendicular to a conveyance direction of the paper placed on the placement section. The tilt degree detection procedure detects a tilt degree of the paper being conveyed along the conveyance path, with respect to a basic posture of the paper. The stop procedure stops conveyance of the paper when a result of detection by the tilt degree detection procedure, that is, a tilt degree of the paper being conveyed, exceeds a threshold value. In addition, the threshold value setting procedure sets the threshold value on a basis of a result of detection by the width dimension detection procedure, that is, on a basis of the width dimension of the paper, strictly speaking, at least before the detection of the tilt degree of the paper by the tilt degree detection procedure.

A control method for a paper conveyance device according to the fourth aspect of the present invention includes a width dimension detection step, a tilt degree detection step, a stopping step, and a threshold value setting step. Here, the paper conveyance device is a device that takes in paper placed on a placement section into a conveyance path in units of one sheet and conveys the paper along the conveyance path. On that basis, the width dimension detection step detects a width dimension which is a dimension of the paper in a direction perpendicular to a conveyance direction of the paper placed on the placement section. The tilt degree detection step detects a tilt degree of the paper being conveyed along the conveyance path, with respect to a basic posture of the paper. The stop step stops conveyance of the paper when a result of detection by the tilt degree detection step, that is, a tilt degree of the paper being conveyed, exceeds a threshold value. In addition, the threshold value setting step sets the threshold value on a basis of a result of detection by the width dimension detection step, that is, on a basis of the width dimension of the paper, and strictly speaking, sets the threshold value at least before the tilt degree detection step detects the tilt degree of the paper.

According to the present invention, it is possible to ensure that the paper is conveyed efficiently without being stopped unnecessarily, while avoiding damage to the paper by the paper conveyed along the conveyance path being caught on the side edges of the conveyance path.

BRIEF DESCRIPTION OF THE DRAWINGS

FIG. 10 is a table illustrating a relation between an estimated width dimension of the document and a threshold value in the first embodiment.

DESCRIPTION OF THE PREFERRED EMBODIMENTS

First Embodiment

A first embodiment of the present invention will be described using a multifunction peripheral (MFP) 10 illustrated in FIG. 1 as an example.

The multifunction peripheral 10 according to the first embodiment is a type of image forming apparatus and has a plurality of functions such as a copy function, a printer function, an image scanner function, and a fax function.

Figure 1:
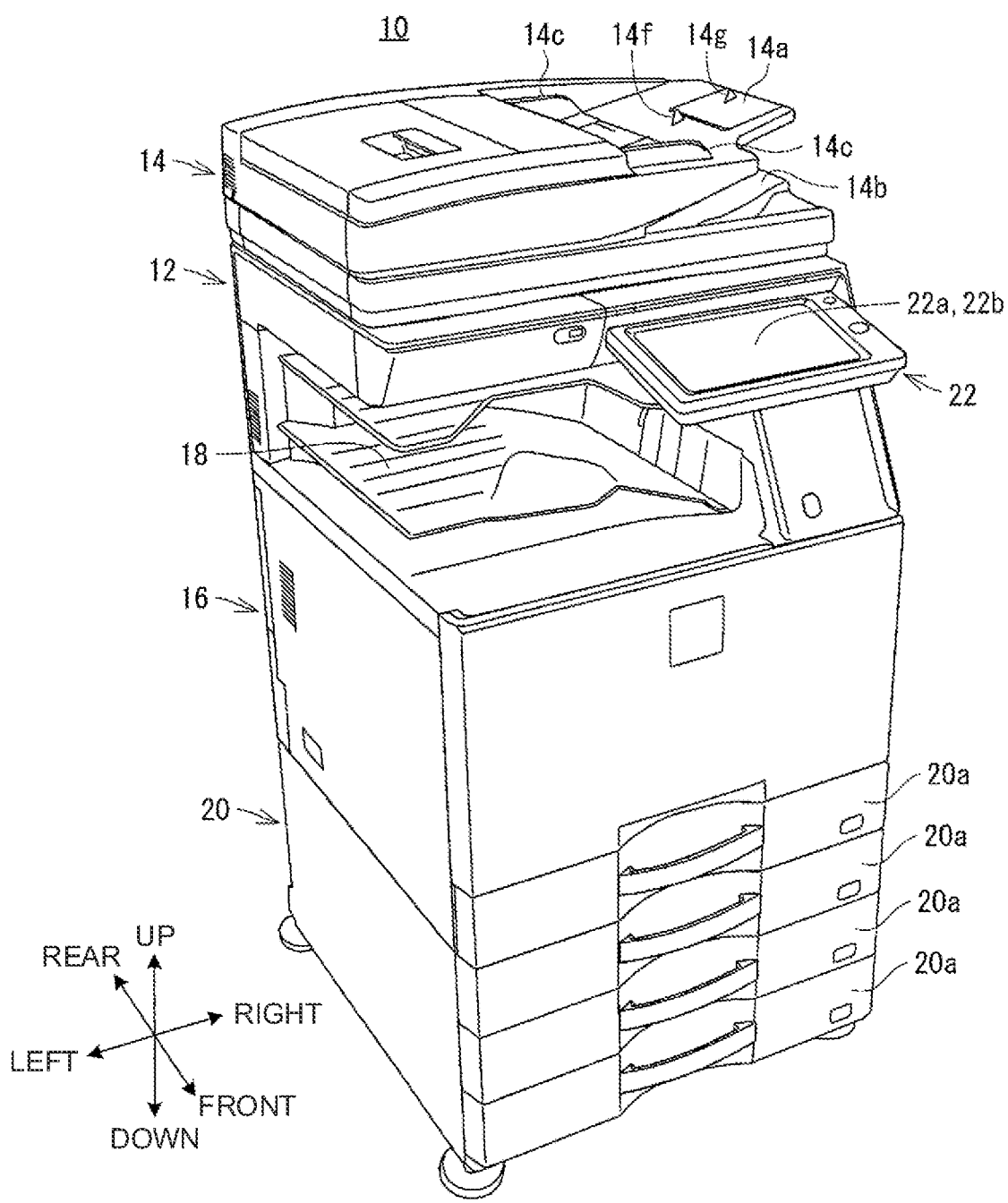
FIG. 1 is a perspective view of a multifunction peripheral according to a first embodiment of the present invention.

FIG. 1 is a perspective view of the multifunction peripheral 10, illustrating a front surface, a upper surface, and a left side surface of the multifunction peripheral 10 installed in a ready-for-use condition. In other words, the up-down direction in FIG. 1 corresponds to the up-down direction of the multifunction peripheral 10. In addition, the right diagonal downward in FIG. 1 corresponds to the front of the multifunction peripheral 10, and the left diagonal upward in FIG. 1 corresponds to the rear of the multifunction peripheral 10. Moreover, the left diagonal downward in FIG. 1 corresponds to the left side of the multifunction peripheral 10, and the right diagonal upward in FIG. 1 corresponds to the right side of the multifunction peripheral 10.

An image reader 12 as an example of an image reader is provided at the upper part of the multifunction peripheral 10. The image reader 12 is responsible for image reading processing described below, that reads an image of a document 100 and outputs two-dimensional read image data corresponding to the read image. Therefore, such an image reader 12 includes a document table (not illustrated) on which the document 100 is placed. The document table is formed by a transparent member such as substantially rectangular flat glass, and is provided with its both main surfaces arranged along the horizontal direction. The upper main surface of the both main surfaces of the document table is the surface on which the document 100 is placed. In addition, an image reading unit (not illustrated) including a light source, a mirror, a lens, a line sensor, and the like and a drive mechanism (not illustrated) for moving (scanning) an image reading position P described below along the lower surface of the document table by the image reading unit are provided below the document table. In other words, in a state where the document 100 is placed on the document table, the image of the document 100 is read by moving the image reading position P by the image reading unit by the drive mechanism, and the image of the document 100 is read by a so-called fixed reading method. Furthermore, above the document table, an automatic document feeder (ADF) 14 which also serves as a document pressing cover for pressing the document 100 placed on the document table is provided.

The automatic document feeder 14 is provided so as to be able to transition between a state where the upper surface of the document table (document placement surface) is exposed to the outside and a state where the upper surface of the document table is covered. Therefore, the automatic document feeder 14 is coupled to the main body (housing) of the multifunction peripheral 10 via a suitable fulcrum support member such as a hinge (not illustrated). FIG. 1 illustrates a state where the automatic document feeder 14 covers the upper surface of the document table. Moreover, the automatic document feeder 14 fulfills an original function in a state where the upper surface of the document table is covered as illustrated in FIG. 1, strictly speaking, in that state, when no object of any kind (except the automatic document feeder 14 per se) such as the document 100 is placed on the document table.

This automatic document feeder 14 will be described in detail below. The automatic document feeder 14 includes a document placement tray 14a as an example of a placement section. On this document placement tray 14a, the document 100, strictly speaking, the sheet-shaped document 100, can be placed, and in particular a plurality of documents 100, 100, . . . can be placed in a stacked manner. Then, the automatic document feeder 14 automatically takes in the document 100 placed on the document placement tray 14a (one sheet at a time) in units of one sheet, and conveys the document 100 along a document conveyance path 200 described below as an example of a conveyance path. In the middle of the conveyance path, the document 100 passes through the aforementioned image reading position P, strictly speaking, which is in a fixed position. As a result, the image of the document 100 is read in a so-called skimming through method. After that, the document 100 is discharged into a document discharge tray 14b.

Furthermore, an image former 16 as an example of an image former is provided below the image reader 12. This image former 16 is responsible for image forming processing that forms an image based on appropriate image data such as the aforementioned read image data on a sheet-shaped paper as an image recording medium (not illustrated), that is, performs printing. This image forming processing is executed by, for example, a known electrophotographic method (Carlson process method). Therefore, the image former 16 includes a photoconductor drum, a charging device, an exposure device, a developing device, a transfer device, a fixing device, cleaning device, static elimination device (each not illustrated), and the like. The paper after the image forming processing by the image former 16, so to speak, the printed paper is discharged to a paper discharge tray 18. The paper discharge tray 18 is provided between the image former 16 and the image reader 12, and is provided in the so-called intracavity space of the multifunction peripheral 10. Moreover, the image former 16 is not limited to executing the image forming processing by the electrophotographic method, and may execute the image forming processing by, for example, an inkjet method.

In addition, a paper feeder 20 as an example of a paper feeder is provided below the image former 16, in other words, at the lower part of the multifunction peripheral 10. The paper feeder 20 includes a plurality of, for example, four paper feed cassettes 20a, 20a, . . . . Each paper feed cassette 20a, 20a, . . . houses paper of an appropriate size, for example, papers of different sizes from each other, and strictly speaking, a plurality of papers can be housed in a stacked manner. Moreover, although not illustrated in FIG. 1, a manual feed tray 20b (see FIG. 11), which is an auxiliary paper feed tray, is provided on the right side surface of the multifunction peripheral 10. Paper of any size can be placed in this manual feed tray 20b, and strictly speaking, a plurality of papers can be placed in a stacked manner. The paper feeder 20 uses one of the respective paper feed cassettes 20a, 20a, . . . and the manual feed tray 20b as a paper feed source, and supplies paper from the paper feed source to the image former 16 in units of one sheet.

Additionally, an operation unit 22 in the shape of a substantially rectangular plate is provided at the front part of the main body of the multifunction peripheral 10, in the upper part of the multifunction peripheral 10. This operation unit 22 is provided so as to be rotatable about one side edge, while the one side edge is coupled to the main body of the multifunction peripheral 10. One main surface of the operation unit 22 (the main surface facing upward in FIG. 1) is an operation surface, and a display 22b with a touch panel 22a is provided on this operation surface.

The display 22b with the touch panel 22a is a component in which a display 22b having a rectangular-shaped display surface and a sheet-shaped touch panel 22a provided to overlap on the display surface of the display 22b are integrally assembled. The touch panel 22a is an example of an operation acceptor (not illustrated) capable of accepting a touch operation by a user using the multifunction peripheral 10, and is, for example, a projection capacitive panel. In addition, the display 22b is an example of a displayer, for example, a liquid crystal display (LCD). The touch panel 22a is not limited to a projection capacitive panel, but may be another type of panel such as a capacitive type of a surface type, an electromagnetic induction type, a resistance film type, and an infrared type. Moreover, the display 22b is not limited to a liquid crystal display, and may be an organic electroluminescence (EL) display.

The user usually stands in front of the multifunction peripheral 10 to use the multifunction peripheral 10 and to operate, among other things, the operation unit 22. To ensure good operability and visibility of the operation surface of the operation unit 22 by the user in such a case, the operation unit 22 is provided so as to be rotatable about the coupling portion with the image reader 12 as described above, that is, the operation unit 22 is provided in such a manner that the angle of the operation surface to the user can be adjusted. Moreover, the operation unit 22 includes an appropriate hardware switch such as a push button switch in addition to the touch panel 22a. In addition, the operation unit 22 includes, in addition to the display 22b, an appropriate light-emitter such as a light emitting diode (LED).

Figure 2:
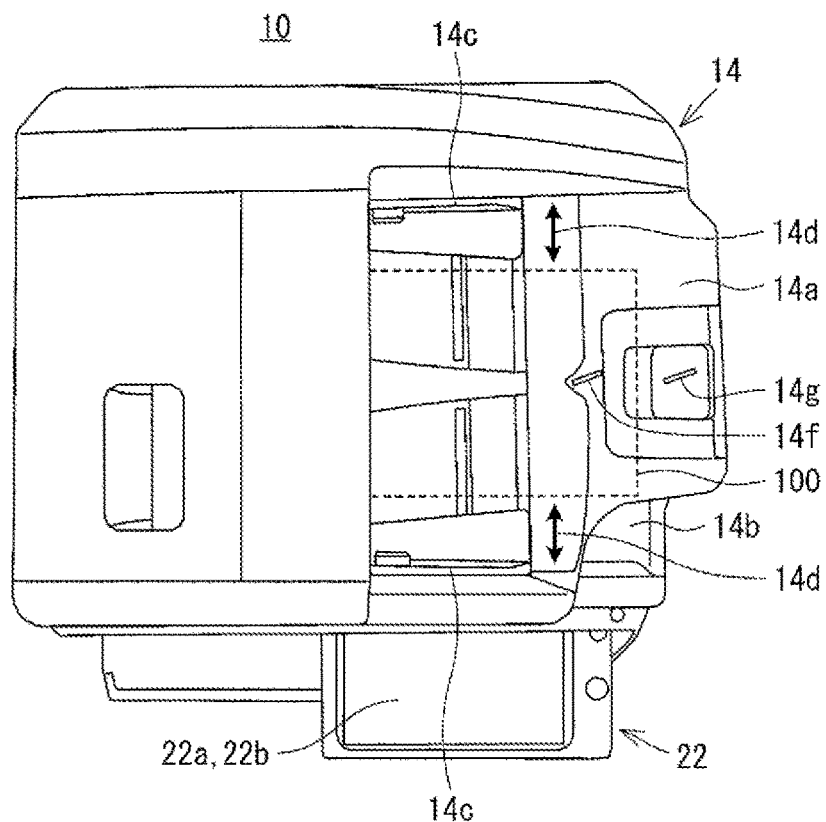
FIG. 2 is a view from above of a state where a document is placed on a document placement tray of an automatic document feeder in the first embodiment.

Here, referring also to FIG. 2, paying attention to the automatic document feeder 14, the automatic document feeder 14 includes a pair of document guides 14c and 14c as an example of a regulator. The document guides 14c and 14c regulate the positions of both side edges of the document 100 in the width direction of the document 100 placed on the document placement tray 14a, strictly speaking, the direction perpendicular to the conveyance direction of the document 100 by the automatic document feeder 14 (the front-rear direction of the multifunction peripheral 10), so to speak, the conveyance width direction. Specifically, the document guides 14c and 14c can be manually moved (slid) along the conveyance width direction as indicated by arrows 14d and 14d in FIG. 2, and mechanically regulate the position of the both side edges of the document 100 by contacting the both side edges of the document 100. In FIG. 2, the document 100 is illustrated in dashed lines for ease of viewing and for convenience of explanation. Moreover, the document guides 14c and 14c move symmetrically in conjunction with each other, that is, when one is moved, the other moves symmetrically in conjunction with it.

In addition, although not illustrated in FIGS. 1 and 2, the automatic document feeder 14 includes a guide width detector 14e (see FIG. 11) described below as an example of a regulated position detector. This guide width detector 14e detects the regulated position by the document guides 14c and 14c and thus detects a guide width which is the mutual distance between the document guides 14c and 14c. Thus, for example, the guide width in a state where the positions of the both side edges of the document 100 in the conveyance width direction are regulated by the document guides 14c and 14c is roughly equivalent to a width dimension La (see FIG. 8), which is a dimension in the conveyance width direction of the document 100. Although a detailed description including illustrations is omitted, the guide width detector 14e includes a variable resistor that is provided to indicate a resistance value according to the position of one or both of the document guides 14c and 14c, and detects the guide width on the basis of the resistance value of this variable resistor. Alternatively, the guide width detector 14e may be configured to detect the position of one or both of the document guides 14c and 14c by an appropriate sensor such as an optical sensor, and thus to detect the guide width.

Furthermore, the automatic document feeder 14 includes a plurality of, for example, two flat projecting document detection pieces 14f and 14g. These two document detection pieces 14f and 14g are arranged at the substantially center of the document placement tray 14a in the conveyance width direction, and at different appropriate positions from each other in the conveyance direction of the document placement tray 14a. In addition, each of the document detection pieces 14f and 14g is in a state of protruding upwardly from the upper surface (document placement surface) of the document placement tray 14a when no external force is applied to the each piece, especially when no external force is applied from above. On the other hand, each of the document detection pieces 14f and 14g is configured to be pushed into the document placement tray 14a by the weight of the document 100 when an external force is applied to the each piece, for example when the each piece is covered by the document 100.

Additionally, although not illustrated in FIGS. 1 and 2, the automatic document feeder 14 includes two document length sensors 14h and 14i (see FIG. 3) described below for detecting the state of each of the document detection pieces 14f and 14g, respectively. These two document length sensors 14h and 14i are provided in the document placement tray 14a. In addition, one document length sensor 14h detects the state of one document detection piece 14f, and the other document length sensor 14i detects the state of the other document detection piece 14g. Each such document length sensor 14h and 14i is, for example, an optical sensor, and in particular is a transmissive optical sensor. Moreover, each of the document length sensors 14h and 14i cooperates with each of the document detection pieces 14f and 14g to constitute a document length detector 14j (see FIG. 11) described below.

Figure 3:
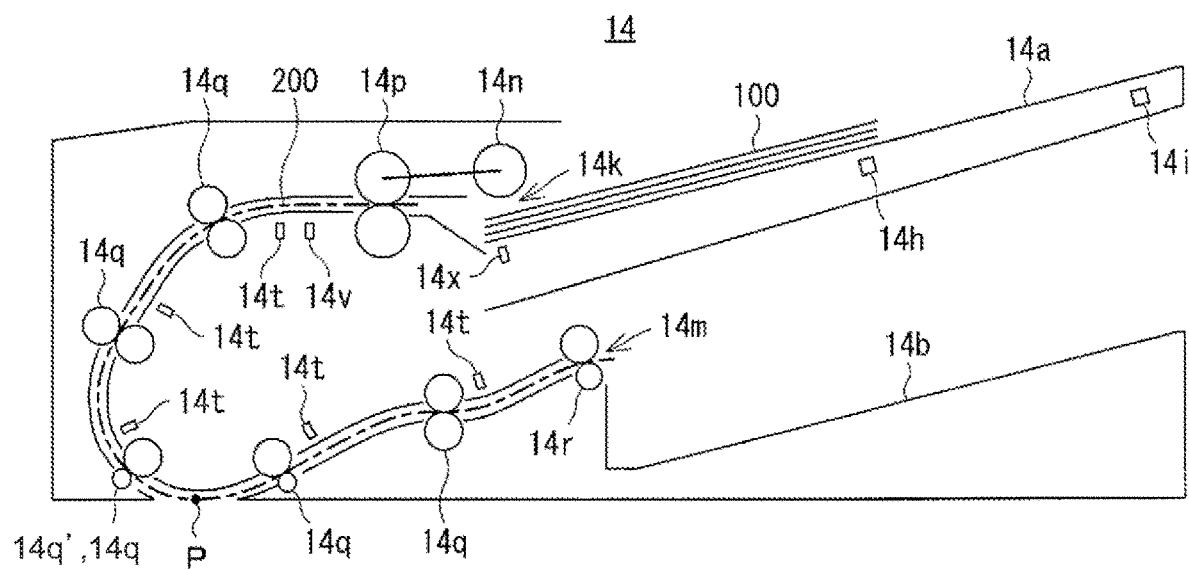
FIG. 3 is a diagram schematically illustrating an internal structure of the automatic document feeder in the first embodiment.

Referring to FIG. 3 and paying attention to the inside of the automatic document feeder 14, the automatic document feeder 14 includes a document conveyance path 200 leading from a paper feed slot 14k on the document placement tray 14a side to a paper discharge slot 14m on the document discharge tray 14b side. This document conveyance path 200 is a substantially U-shaped (or substantially C-shaped) when viewed from, for example, the side.

In the vicinity of the paper feed slot 14k of the document conveyance path 200, a pickup roller 14n is provided for picking up the document 100 placed on the document placement tray 14a from the document placement tray 14a in units of one sheet. The document 100 picked up from the document placement tray 14a by the pickup roller 14n is taken into the document conveyance path 200 through the paper feed slot 14k. For this purpose, a paper feed roller 14p is provided at an end of the document conveyance path 200 on the paper feed slot 14k side, so to speak, at the upstream end.

In addition, in the middle of the document conveyance path 200, a plurality of conveyance rollers 14q, 14q, . . . are provided as appropriate for conveying the document 100 taken into the document conveyance path 200 along the document conveyance path 200. In addition, the aforementioned image reading position P is arranged in the middle of the document conveyance path 200. A conveyance roller 14q' immediately before the image reading position P in the conveyance direction (upstream side closest to the image reading position P) of each of the conveyance rollers 14q, 14q, . . . also serves as a resist roller for adjusting the timing of feeding the document 100 to the image reading position P. Moreover, the image reading position P extends in a direction perpendicular to the plane of FIG. 3 (main scanning direction). Then, as the document 100 passes through the image reading position P in the process of the document 100 being conveyed along the document conveyance path 200, the image reading position P moves relative to the conveyance direction (sub-scanning direction) of the document 100, and as a result, the image of the document 100 is read in the so-called skimming through method.

The document 100 that has passed through the image reading position P is discharged into the document discharge tray 14b through the paper discharge slot 14m, which is the downstream end of the document conveyance path 200. A paper discharge roller 14r is provided at the paper discharge slot 14m. Each of the pickup roller 14n, the paper feed roller 14p and each of the conveyance rollers 14q, 14q, . . . including this paper discharge roller 14r, is driven by a roller driver 14s (see FIG. 11) described below.

Furthermore, a plurality of document conveyance sensors 14t, 14t, . . . are appropriately provided in the middle of the document conveyance path 200 for detecting the document 100 being conveyed along the document conveyance path 200, in other words, for detecting that the document 100 has passed through the path. Each of these document conveyance sensors 14t, 14t, . . . is, for example, an optical sensor, and in particular is a reflective optical sensor. Each document conveyance sensor 14t, 14t, . . . constitutes a conveyance detector 14u (see FIG. 11) described below.

In addition, a tilt sensor 14v is provided in the middle of the document conveyance path 200, at an appropriate position upstream in the document conveyance path 200, for example, at a position between the most upstream document conveyance sensor 14t and the paper feed roller 14p, and strictly speaking, two tilt sensors 14v and 14v are provided. These two tilt sensors 14v and 14v constitute a tilt detector 14w (see FIG. 11) described below as an example of a tilt degree detector. Respective tilt sensor 14v and 14v are a sensor of the same specifications as each other, for example a reflective optical sensor.

Additionally, a document placement sensor 14x is provided at an appropriate position in the document placement tray 14a, for example, at a position in the document placement tray 14a near the paper feed slot 14k. The document placement sensor 14x is an example of a document placement detector because the document placement sensor 14x detects whether the document 100 is placed on the document placement tray 14a. This document placement sensor 14x is also a reflective optical sensor, for example. In addition, each document length sensor 14h and 14i is provided at an appropriate position in the document placement tray 14a, in particular, corresponding to the position of each document detection piece 14f and 14g described above.

Figure 4:
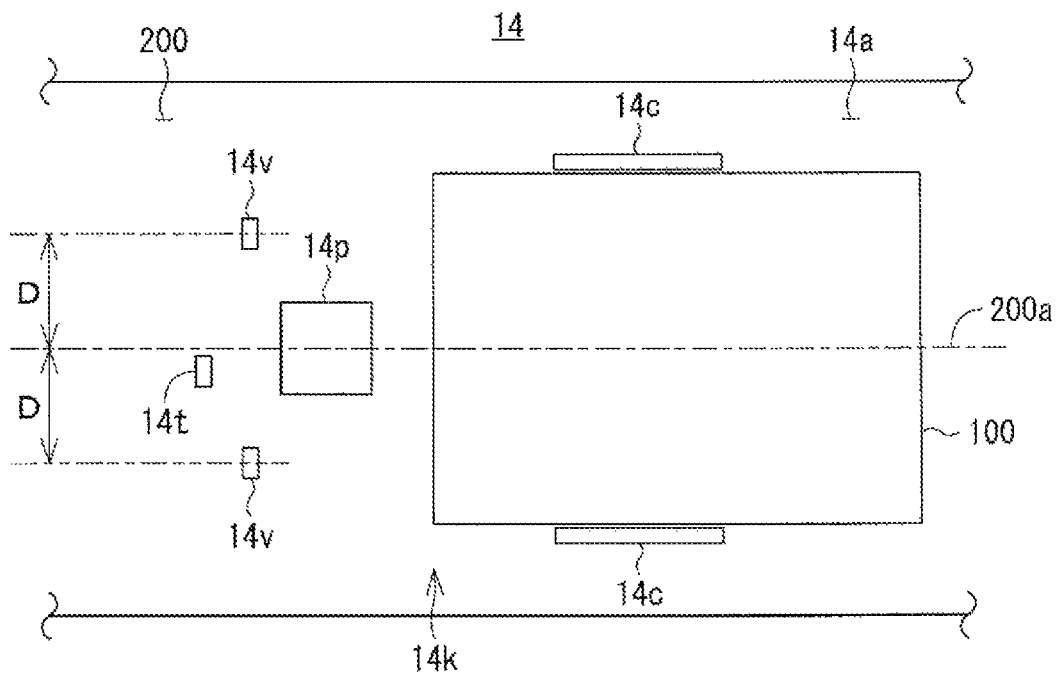
FIG. 4 is a diagram illustrating an arrangement position of a tilt sensor of the automatic document feeder in the first embodiment.

As illustrated in FIG. 4, the two aforementioned tilt sensors 14v and 14v are symmetrically provided with respect to a center line 200a of the document conveyance path 200 (a line representing a center in the conveyance width direction (up-down direction in FIG. 4) of the document conveyance path 200). Specifically, the respective tilt sensors 14v and 14v are provided at the same (conjugate) position with respect to each other in the conveyance direction (right-left direction in FIG. 4), in particular, provided between the document conveyance sensor 14t and the paper feed roller 14p at the most upstream side as described above. In addition, in the conveyance width direction, the respective tilt sensors 14v and 14v are provided at a position at a same distance D from each other from the center line 200a of the document conveyance path 200.

This distance D is, for example, 70 mm. In other words, a mutual distance 2*D between each tilt sensor 14v and 14v in the conveyance width direction is 140 mm. This mutual distance 2*D is determined in accordance with the minimum size of the document 100. Here, an A5 size is assumed as the minimum size of the document 100, and the mutual distance 2*D is set to a value slightly smaller than the short side dimension (148 mm) of the A5 size.

In FIG. 4, the document 100 is placed on the document placement tray 14a, and the positions of the two edges of the document 100 in the conveyance width direction are regulated by the document guides 14c and 14c. When the document 100 is in this state, both side edges in the conveyance width direction of the document 100 are parallel to the center line 200a of the document conveyance path 200. The posture of the document 100 when both side edges of the document 100 in the conveyance width direction are parallel to the center line 200a of the document conveyance path 200 is referred to as the basic posture. Moreover, in FIG. 4, the document conveyance sensor 14t (at the most upstream side) is located off the center line 200a of the document conveyance path 200, but each of the document conveyance sensors 14t may be provided on the center line 200a of the document conveyance path 200.

Figure 5:
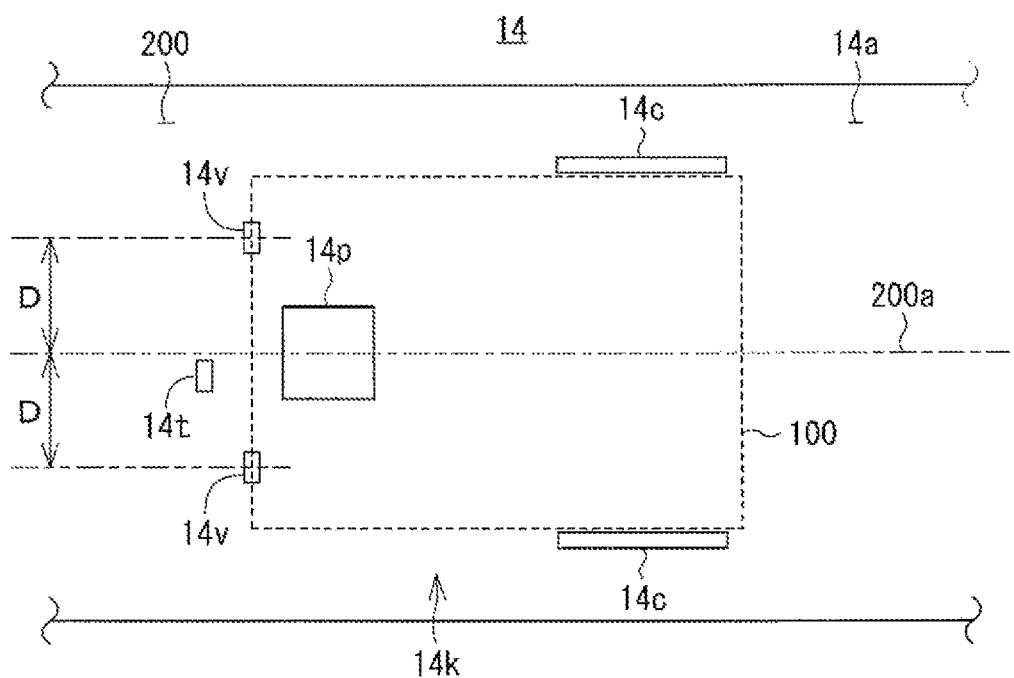
FIG. 5 is a diagram schematically illustrating one state when a document is conveyed by the automatic document feeder in the first embodiment.

In the state illustrated in FIG. 4, suppose that the document 100 placed on the document placement tray 14a is taken into the document conveyance path 200 in units of one sheet through the paper feed slot 14k, and is conveyed along the document conveyance path 200. Then, as illustrated in FIG. 5, suppose that the downstream edge (the left edge in FIG. 5) of the document 100 reaches the position of each of the tilt sensors 14v and 14v, respectively, with the document 100 maintaining the basic posture. In this case, the downstream edge of the document 100 is detected simultaneously by each of the tilt sensors 14v and 14v. In other words, the detection timing of the downstream edge of the document 100 by each of the tilt sensors 14v and 14v matches. In FIG. 5, the document 100 is illustrated in dashed lines for ease of viewing.

Figure 6:
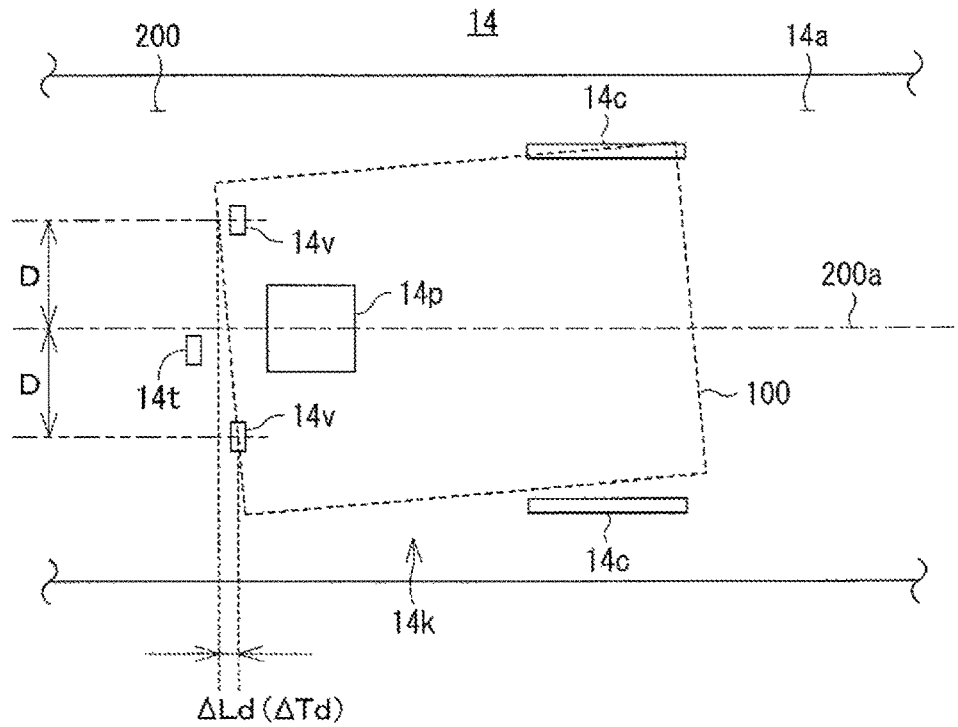
FIG. 6 is a diagram schematically illustrating another state when a document is conveyed by the automatic document feeder in the first embodiment.

In contrast, suppose, for example, as illustrated in FIG. 6, that the document 100 is conveyed in a tilted state, that is, the document 100 is skewed. In this case, a time deviation ΔTd occurs in the timing at which the downstream edge of the document 100 reaches the position of each of the tilt sensors 14v and 14v, that is, in the timing at which the downstream edge of the document 100 is detected by each of the tilt sensors 14v and 14v. In other words, in the conveyance direction, there is a positional deviation ΔLd between the detection position of the downstream edge of the document 100 by one tilt sensor 14v and the detection position of the downstream edge of the document 100 by the other tilt sensor 14v. Also in FIG. 6, the document 100 is illustrated in dashed lines for ease of viewing.

Here, if a conveyance speed of the document 100 is Vc, the relation between the positional deviation ΔLd and the time deviation Td is expressed by a following formula 1.

$$\Delta Ld = Vc * \Delta Td \quad \text{Formula 1}$$

The positional deviation ΔLd and the time deviation ΔTd indicate the tilt degree of the document 100 relative to the basic posture. In addition, if the tilt degree of the document 100 is excessively large, the document 100 may be damaged by being caught on the side edges of the document conveyance path 200. To avoid this, in the present first embodiment, when the tilt degree of the document 100 is excessively large, for example, when the positional deviation ΔLd is larger than a predetermined threshold value ΔLs (ΔLd>ΔLs), the conveyance of the document 100 is automatically stopped.

Figure 7:
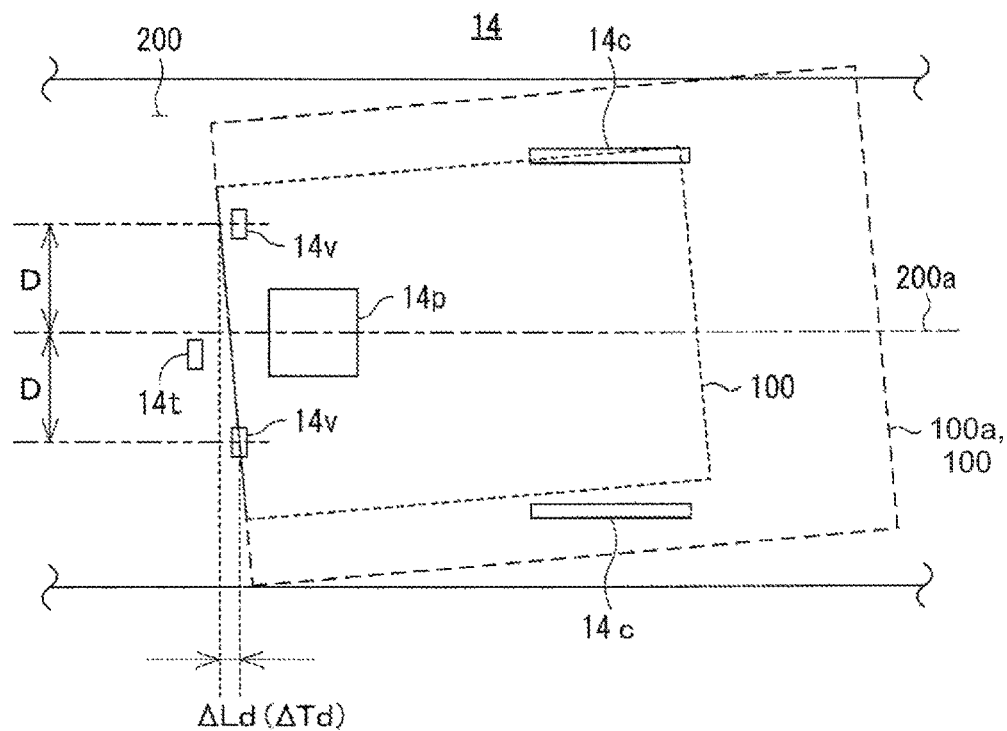
FIG. 7 is a diagram for explaining an inconvenience caused by tilting of a document being conveyed by the automatic document feeder in the first embodiment.

However, even if the positional deviation ΔLd is the same, that is, even if the tilt degree of the document 100 relative to the basic posture is the same, for example, as illustrated by a long dashed line 100a in FIG. 7, the larger the size of the document 100, particularly, the larger the width dimension La (see FIG. 8), the higher the possibility that the document 100 will be caught on the side edges of the document conveyance path 200. On the other hand, if the width dimension La of the document 100 is relatively small, even if the document 100 is tilted slightly, the document 100 is unlikely to be caught on the side edges of the document conveyance path 200.

From this point of view, it is preferable that the threshold value ΔLs referred to here be changed appropriately in accordance with the size of the document 100, in particular in accordance with the width dimension La. In other words, it is preferable that the threshold value ΔLs is adaptively changed in such a manner that the larger the width dimension La of the document 100 is, the smaller the threshold value ΔLs becomes. This ensures that the document 100 is conveyed efficiently without being stopped unnecessarily, while avoiding damage to the document 100 by the document 100 being caught on the side edges of the document conveyance path 200.

Figures 8, 9:
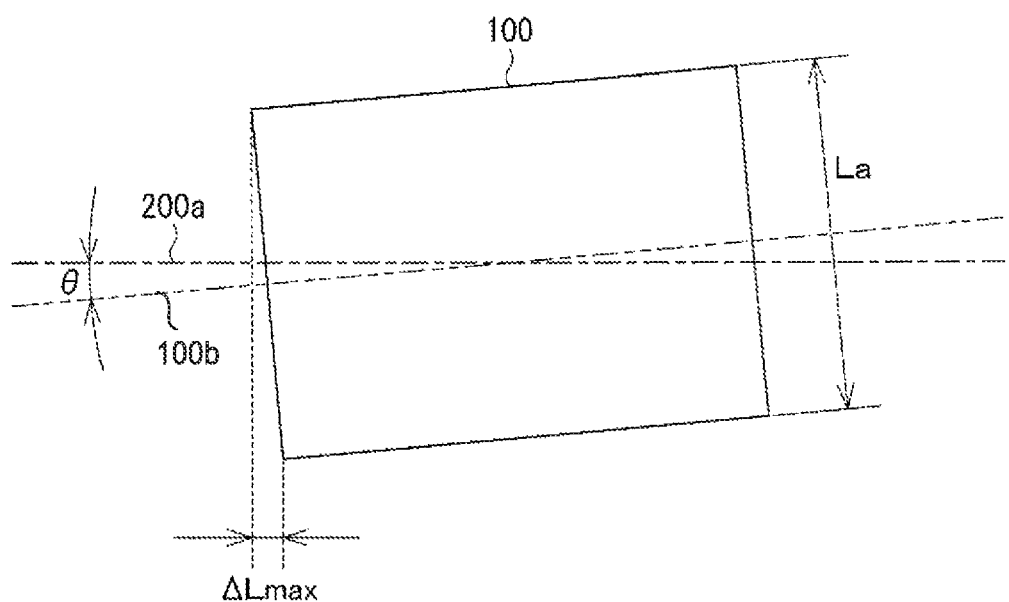
FIG. 8 is a diagram schematically illustrating an example of a state where a document being conveyed by the automatic document feeder in the first embodiment is tilted.
FIG. 9 is a table illustrating a list of each value including a width dimension for each size of the document in the first embodiment.

Specifically, as illustrated in FIG. 8, for example, a tilt angle θ of the document 100 relative to the basic posture, a positional deviation maximum value ΔLmax of the document 100 in the conveyance direction, and the width dimension La of the document 100 are defined. The tilt angle θ is an angle formed between the center line 200a of the document conveyance path 200 and a center line (a line representing the center in the conveyance width direction of the document 100) 100b of the document 100 when the document 100 is in the basic posture. In addition, the positional deviation maximum value ΔLmax is the mutual distance in the conveyance direction between the two downstream (or upstream) corners of the document 100. Moreover, the width dimension La is a dimension in the conveyance width direction of the document 100 when the document 100 is in the basic posture.

Then, for example, consider a case where the positional deviation maximum value ΔLmax is limited to a certain value of 7 mm regardless of the size of the document 100, or in other words, a case where the positional deviation maximum value ΔLmax is allowed up to 7 mm. In this case, the width dimension La, the tilt angle θ, and the positional deviation ΔLd are organized for each size assumed as the size of the document 100 as illustrated in FIG. 9. In FIG. 9, the positional deviation maximum value ΔLmax is also described in a confirmatory manner. Moreover, the tilt angle θ is expressed by a following formula 2.

$$\theta = \arcsin(\Delta Lmax/La) \quad \text{Formula 2}$$

In this FIG. 9, paying particular attention to the positional deviation ΔLd, for example, when the size of the document 100 is A5R (horizontally placed A5) size, the positional deviation ΔLd is approximately 6.6 mm (rounded down to the second decimal place). In addition, when the size of the document 100 is B5R (horizontally placed B5) size, the positional deviation ΔLd is approximately 5.3 mm. Furthermore, when the size of the document 100 is A4R (horizontally placed A4) size or A5, the positional deviation ΔLd is approximately 4.6 mm. In addition, when the size of the document 100 is B4 (strictly speaking, horizontally placed B4) size or B5, the positional deviation ΔLd is approximately 3.8 mm. Additionally, when the size of the document 100 is A3 (strictly speaking, horizontally placed A3) size or A4, the positional deviation ΔLd is approximately 3.2 mm.

Figure 10:
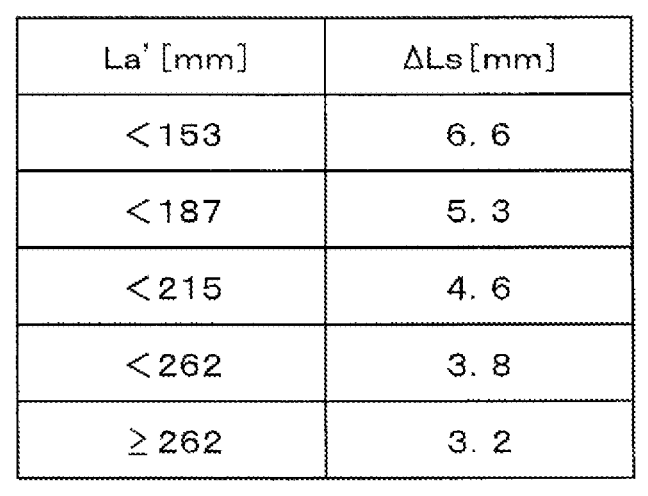

On the basis of the positional deviation ΔLd for each size of the respective documents 100 illustrated in FIG. 9, or strictly speaking for each width dimension La, the threshold value ΔLs is determined for each such width dimension La, or strictly speaking, for each estimated width dimension La' which is an estimated value of the width dimension La. FIG. 10 illustrates an example of this.

As illustrated in this FIG. 10, for example, in a case where the estimated width dimension La' is less than 153 mm (La'<153 mm), a value of 6.6 mm is set to the threshold value ΔLs. Here, the value of 153 mm is determined in accordance with the width dimension (148 mm) of the A5R size document 100, and in particular is a value slightly (5 mm) larger than the width dimension. In addition, in a case where the estimated width dimension La' is 153 mm or more and less than 187 mm (153 mm≤La'<187 mm), a value of 5.3 mm is set to the threshold value ΔLs. Here, the value of 187 mm is determined in accordance with the width dimension (182 mm) of the B5R size document 100, and in particular is a value slightly (5 mm) larger than the width dimension. Furthermore, in a case where the estimated width dimension La' is 187 mm or more and less than 215 mm (187 mm≤La'<215 mm), a value of 4.6 mm is set to the threshold value ΔLs. Here, the value of 215 mm is determined in accordance with the width dimension (210 mm) of the A4R or A5 size document 100, and in particular is a value slightly (5 mm) larger than the width dimension. Moreover, in a case where the estimated width dimension La' is 215 mm or more and less than 262 mm (215 mm≤La'<262 mm), a value of 3.8 mm is set to the threshold value ΔLs. Here, the value of 262 mm is determined in accordance with the width dimension (257 mm) of the B4 or B5 size document 100, and in particular is a value slightly (5 mm) larger than the width dimension. In addition, in a case where the estimated width dimension La' is 262 mm or more (La'≥262 mm), a value of 3.2 mm is set to the threshold value ΔLs.

This threshold value ΔLs is set on the basis of the estimated width dimension La' at the time when the operation instructing the start of the feeding operation of the document 100 by the automatic document feeder 14 is accepted in a state where the document 100 is placed on the document placement tray 14a. Moreover, with regard to the estimated width dimension La', the minimum value of the detection result by the guide width detector 14e (guide width) and the specified value of the width dimension La based on the detection result by a document size detection function (document size) described below is identified as the estimated width dimension La'.

After the threshold value ΔLs is set in accordance with the width dimension La of the document 100 in this way, the feeding operation of the document 100 by the automatic document feeder 14 is started, that is, the conveyance of the document 100 is started. Then, on the basis of the detection timing of the downstream edge of the document 100 by each of the aforementioned tilt sensors 14v and 14v, the time deviation ΔTd is obtained, and the positional deviation ΔLd is further obtained on the basis of the formula 1. Here, for example, if the positional deviation ΔLd is larger than the threshold value ΔLs, the conveyance of the document 100 is stopped. On the other hand, if the positional deviation ΔLd is less than or equal to the threshold value ΔLs (ΔLd≤ΔLd), the conveyance of the document 100 is continued.

Figure 11:
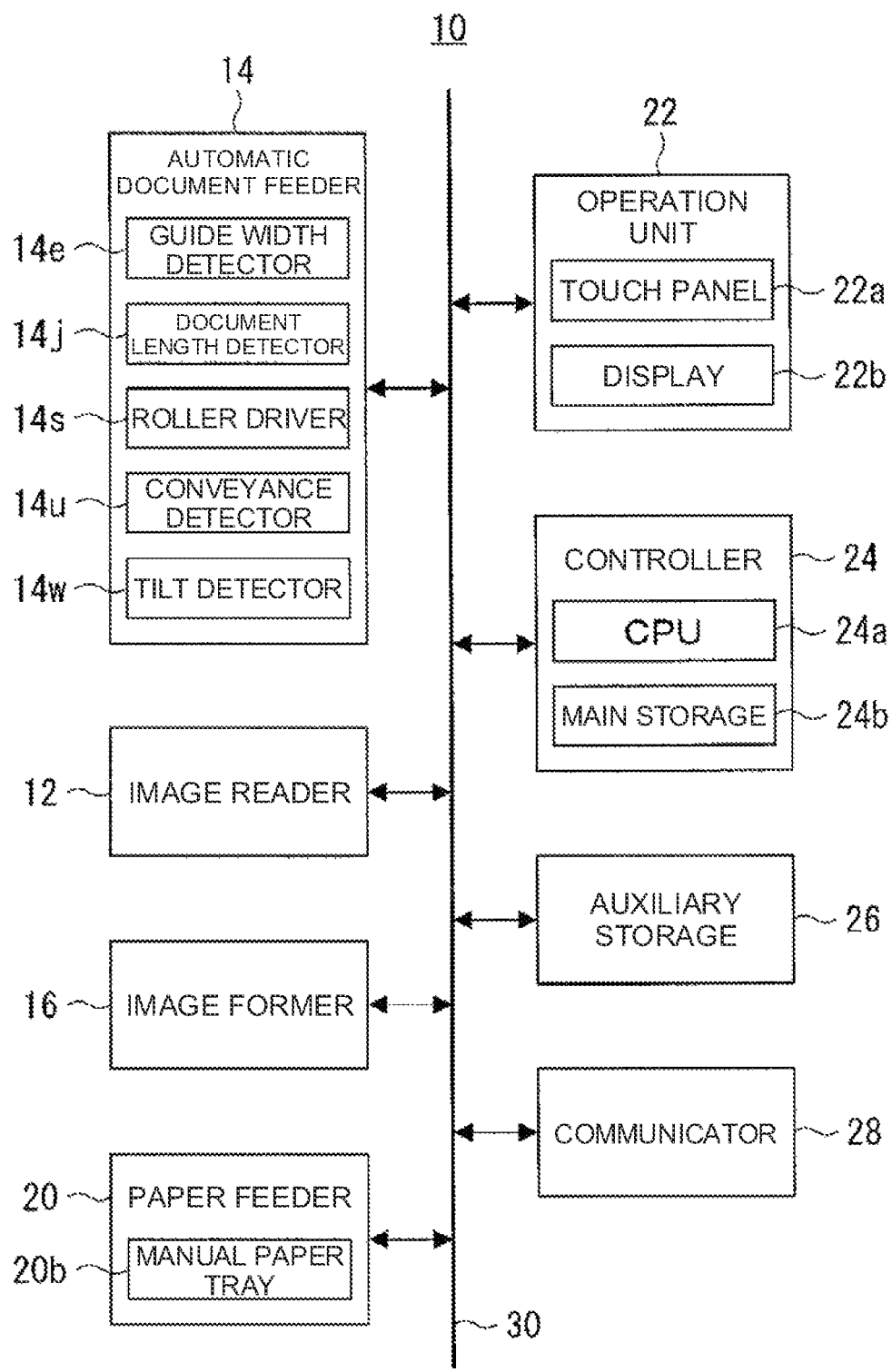
FIG. 11 is a block diagram illustrating an electrical configuration of a multifunction peripheral according to the first embodiment.

FIG. 11 is a block diagram illustrating an electrical configuration of the multifunction peripheral 10. As illustrated in FIG. 11, the multifunction peripheral 10 includes the image reader 12, automatic document feeder 14, image former 16, paper feeder 20, and operation unit 22, as well as a controller 24, an auxiliary storage 26, and a communicator 28. These are connected via a bus 30 that is common to each of the above components. The image reader 12, automatic document feeder 14, image former 16, paper feeder 20 and operation unit 22 are as described above.

The controller 24 is an example of a controller that controls the overall control of the multifunction peripheral 10. For this purpose, the controller 24 includes a computer, such as a CPU 24a, as a control executor. In addition, the controller 24 includes a main storage 24b as a main storage directly accessible by the CPU 24a. The main storage 24b includes a ROM and a RAM (which are not illustrated). A control program (firmware) for controlling the operation of the CPU 24a is stored in the ROM. In addition, the RAM constitutes a work area and a buffer area when the CPU 24a executes processing based on the control program.

The auxiliary storage 26 is an example of an auxiliary storage. In other words, various data such as the aforementioned read image data are appropriately stored in the auxiliary storage 26. Such an auxiliary storage 26 includes, for example, a hard disk drive (not illustrated). In addition, the auxiliary storage 26 may include a rewritable nonvolatile memory such as a flash memory.

The communicator 28 is an example of a communicator. In other words, the communicator 28 is connected to a communication network (not illustrated) and thereby is responsible for bidirectional communication via the communication network. The communication network mentioned here includes a LAN, the Internet, and a public switched telephone network. Moreover, the LAN also includes a wireless LAN.

And again, paying attention to the automatic document feeder 14, the automatic document feeder 14 includes the guide width detector 14e, a document length detector 14j, a roller driver 14s, a conveyance detector 14u, and a tilt detector 14w. As described above, the guide width detector 14e detects the regulated position by the document guides 14c and 14c and thus detects a guide width which is the mutual distance between the document guides 14c and 14c. The document length detector 14j includes respective document detection pieces 14f and 14g and respective document length sensors 14h and 14i. This document length detector 14j detects a document length dimension which is the dimension of the document 100 in the conveyance direction, on the basis of the output signal of each of the document length sensors 14h and 14i, that is, on the basis of the state of each of the document detection pieces 14f and 14g.

The guide width detector 14e and the document length detector 14j cooperate with the CPU 24a to implement the document size detection function described above. In other words, the CPU 24a detects (calculates) the size of the document 100 on the basis of the detection result by the guide width detector 14e (guide width) and the detection result by the document length detector 14j (document length dimension). The CPU 24a, the guide width detector 14e, and the document length detector 14j, which implement the document size detection function, are examples of a size detector.

Furthermore, the roller driver 14s drives each of the pickup roller 14n, paper feed roller 14p, respective conveyance rollers 14q, 14q, . . . and paper discharge roller 14r as described above. In addition, the conveyance detector 14u includes respective document conveyance sensors 14t, 14t, . . . . This conveyance detector 14u detects the position (conveyance position) of the document 100 being conveyed along the document conveyance path 200, on the basis of the output signal of each of the document conveyance sensors 14t, 14t, . . . , respectively. Moreover, the tilt detector 14w includes respective tilt sensors 14v and 14v. This tilt detector 14w obtains the aforementioned time deviation ΔTd on the basis of the output signal of each of the tilt sensors 14v and 14v, respectively, and thus obtains the positional deviation ΔLd on the basis of the formula 1.

Additionally, paying attention to the paper feeder 20, the paper feeder 20 includes a manual feed tray 20b in addition to the respective paper feed cassettes 20a, 20a, . . . described above. Then, paying attention to the operation unit 22, the operation unit 22 includes the touch panel 22a and the display 22b, that is, the display 22b with the touch panel 22a.

Figure 12:
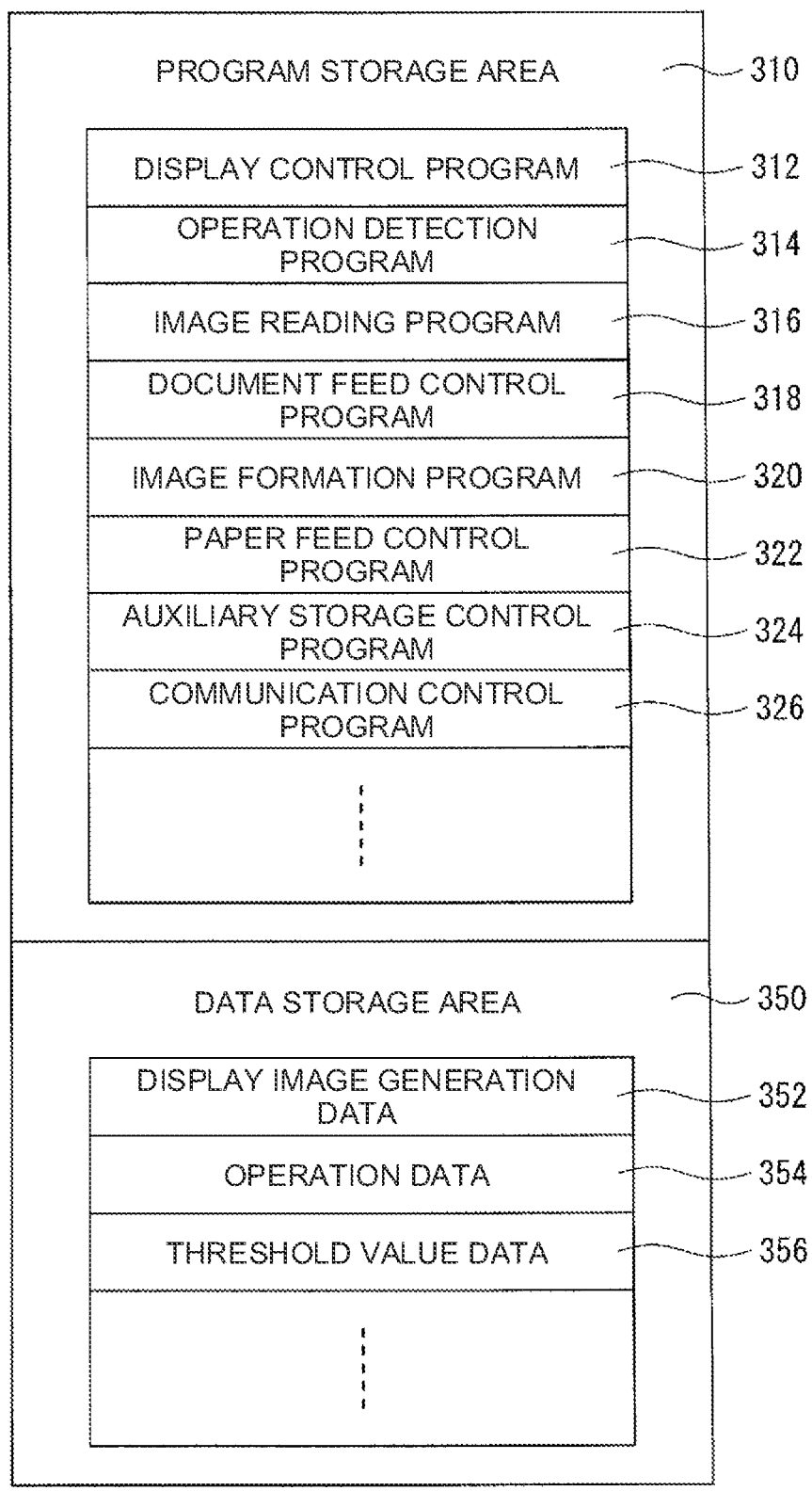
FIG. 12 is a memory map conceptually illustrating a configuration in a RAM of a main storage in the first embodiment.

FIG. 12 is a memory map 300 conceptually illustrating a configuration in the RAM of the main storage 24b. As illustrated in this memory map 300, the RAM includes a program storage area 310 and a data storage area 350.

In the program storage area 310, the aforementioned control program is stored. Specifically, the control program includes a display control program 312, an operation detection program 314, an image reading program 316, a document feed control program 318, an image formation program 320, and a paper feed control program 322. In addition, the control program includes an auxiliary storage control program 324 and a communication control program 326.

The display control program 312 is a program for generating display screen data necessary for displaying various screens, such as the home screen (not illustrated), on the display 22b. The operation detection program 314 is a program for detecting a state of an operation to the touch panel 22a. The image reading program 316 is a program for controlling the image reader 12. The document feed control program 318 is a program for controlling the automatic document feeder 14. The image formation program 320 is for controlling the image former 16. The paper feed control program 322 is a program for controlling the paper feeder 20. The auxiliary storage control program 324 is a program for controlling the auxiliary storage 26. In addition, the communication control program 326 is for controlling the communicator 28.

Although detailed illustrations are omitted, the document feed control program 318 includes a threshold value setting program for causing the CPU 24a to execute a threshold value setting task described below. This threshold value setting program includes a threshold value table that organizes the relation between the estimated width dimension La' and the threshold value ΔLs illustrated in FIG. 10. In addition, the document feed control program 318 includes a skew monitoring program for causing the CPU 24a to execute a skew monitoring task described below.

Meanwhile, various pieces of data are stored in the data storage area 350. These various pieces of data include display image generation data 352, operation data 354, and threshold value data 356.

The display image generation data 352 is data such as polygon data and texture data used for generating the display screen data based on the display control program 312 described above. The operation data 354 is data representing the state of an operation to the touch panel 22a, and in particular, is time-series data representing the touch position (coordinates) of the user to the touch panel 22a. In addition, the threshold value data 356 is data representing the threshold value ΔLs, and in particular, is data representing the threshold value ΔLs which is set by the threshold value setting task described next.

Figure 13:
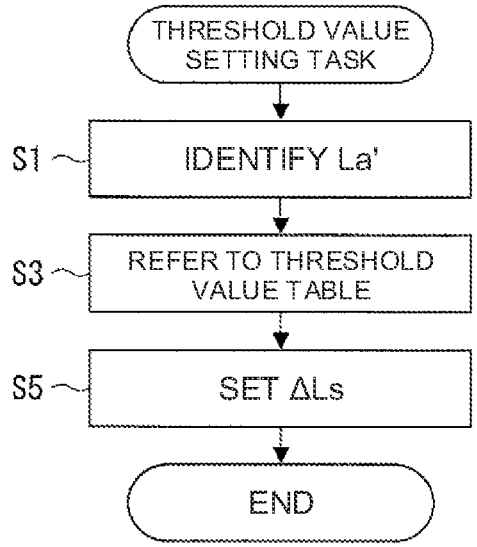
FIG. 13 is a flow diagram illustrating a flow of a threshold value setting task in the first embodiment.

The CPU 24a executes the threshold value setting task in accordance with the threshold value setting program described above. The flow of this threshold value setting task is illustrated in FIG. 13. In a state where the document 100 is placed on the document placement tray 14a, when the operation instructing the start of the feeding operation of the document 100 by the automatic document feeder 14 is accepted, in response to this, the CPU 24*a* executes the threshold value setting task.

According to this threshold value setting task, the CPU 24*a* first identifies the estimated width dimension La' in step S1. Specifically, the CPU 24*a* identifies the minimum value of the detection result by the guide width detector 14*e* (guide width) and the specified value of the width dimension La based on the detection result by the document size detection function (document size) is identified as the estimated width dimension La'. Then, the CPU 24*a* advances the processing to step S3.

In step S3, the CPU 24*a* refers to the aforementioned threshold value table to recognize the threshold value ΔLs corresponding to the estimated width dimension La' identified in step S1. Then, the CPU 24*a* advances the processing to step S5.

In step S5, the CPU 24*a* sets the threshold value ΔLs recognized in step S3, and in particular, stores the threshold value data 356 representing the threshold value ΔLs. With this, the CPU 24*a* ends the threshold value setting task.

The CPU 24*a* that executes the threshold value setting task, in particular, the CPU 24*a* that executes step S1, is an example of a width dimension detector. In addition, the CPU 24*a* that executes step S3 and step S5 is an example of a threshold value setter.

Figure 14:
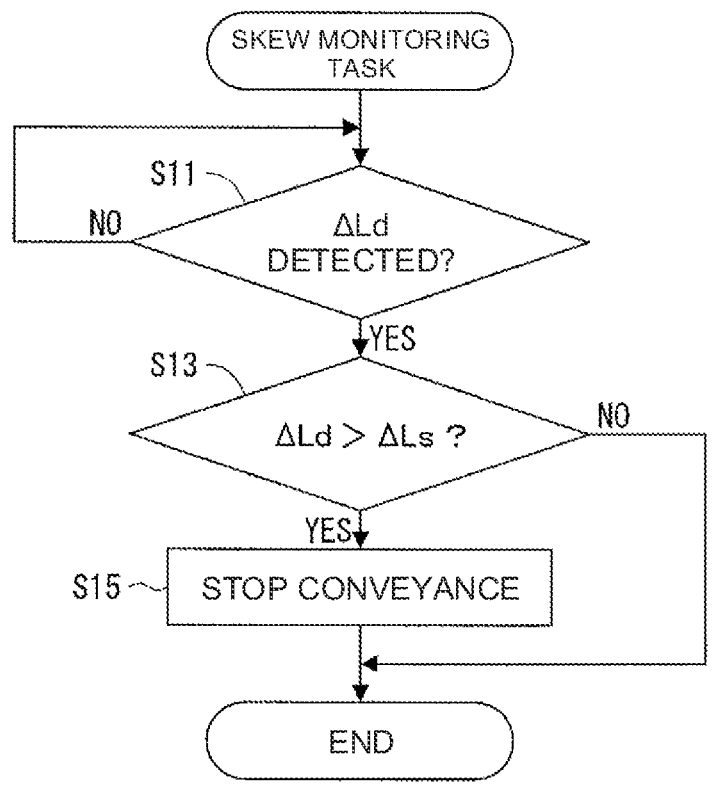
FIG. 14 is a flow diagram illustrating a flow of a skew monitoring task in the first embodiment.

After executing this threshold value setting task, the CPU 24*a* executes a skew monitoring task in accordance with the aforementioned skew monitoring program. The flow of this skew monitoring task is illustrated in FIG. 14. The CPU 24*a* executes the skew monitoring task in response to the timing at which the document 100 is taken from the document placement tray 14*a* into the document conveyance path 200 via the paper feed slot 14*k*.

According to this skew monitoring task, the CPU 24*a* first waits for the positional deviation ΔLd to be detected by the tilt detector 14*w* in step S11 (S11: NO). Then, when the positional deviation ΔLd is detected by the tilt detector 14*w* (S11: YES), the CPU 24*a* advances the processing to step S13.

In step S13, the CPU 24*a* compares the positional deviation ΔLd detected in step S11 with the threshold value ΔLs based on the threshold value data 356. Here, for example, if the positional deviation ΔLd is larger than the threshold value ΔLs (S13: YES), the CPU 24*a* advances the processing to step S15. On the other hand, if the positional deviation ΔLd is less than or equal to the threshold value ΔLs (ΔLd≤ΔLs) (S13: NO), the CPU 24*a* ends the skew monitoring task.

In step S15, the CPU 24*a* controls the automatic document feeder 14 to, strictly speaking, stop the conveyance of the document 100, and among other things, controls the roller driver 14*s*. With this, the CPU 24*a* ends the skew monitoring task.

The CPU 24*a* that executes the skew monitoring task, in particular, the CPU 24*a* that executes step S15, is an example of a stopper. Moreover, when the conveyance of the document 100 is stopped by the execution of step S15, a suitable message may be output to inform the user.

As described above, according to the present first embodiment, when the tilt degree of the document 100 being conveyed along the document conveyance path 200 with respect to the basic posture is excessively large, in particular, when the positional deviation ΔLd is larger than the threshold value ΔLs, the conveyance of the document 100 is stopped. In addition, the threshold value ΔLs is set in accordance with the width dimension La of the document 100, and in particular, the larger the width dimension La, the smaller the threshold value ΔLs. This ensures that the document 100 is conveyed efficiently without being stopped unnecessarily, while avoiding damage to the document 100 by the document 100 being caught on the side edges of the document conveyance path 200.

Second Embodiment

Next, a second embodiment of the present invention will be described.

The present second embodiment is suitable when the document 100 is thin paper (thin leaf paper) of having a small thickness. In other words, thin paper, such as a tracing paper, is mechanically more delicate and easily damaged than a plain paper, for example. For this reason, in a case where the document 100 provided to the automatic document feeder 14 is thin paper, for example, the conveyance speed Vc is reduced and other appropriate conditions are changed compared to a case where the document 100 is a plain paper.

Figure 15:
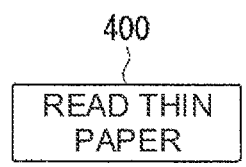
FIG. 15 is a diagram illustrating another function setting screen in a second embodiment of the present invention.

Specifically, in the present second embodiment, thin paper reading key 400 such as that illustrated in FIG. 15 is provided and displayed, for example, on the display 22*b* with the touch panel 22*a*. Then, in a case where the document 100 is thin paper, the conditions for the thin paper are set by operating the thin paper reading key 400. The thin paper reading key 400 is an example of a user operation acceptor.

In a case where the condition for thin paper is set in this way, that is, a case where the document 100 is thin paper, as an alternative to the threshold value ΔLs described above, a threshold value for thin paper α*ΔLs (where the threshold value ΔLs is multiplied by a predetermined coefficient α) is applied. The coefficient α here is a value that is greater than zero and less than one (0<α<1), for example 0.5.

As described above, according to the present second embodiment, in a case where the document 100 is thin paper, as an alternative to the threshold value ΔLs described above, a threshold value for thin paper α*ΔLs, which is smaller than the threshold value ΔLs, is applied. In short, in a case where the document 100 is thin paper, the criteria for determining whether to stop the conveyance of the document 100 are more stringent. Even in a case where the document 100 is thin paper, this ensures that the document 100 is conveyed efficiently without being stopped unnecessarily, while avoiding damage to the document 100 by the document 100 being caught on the side edges of the document conveyance path 200.

The coefficient α may be not constant, but may be changed in accordance with, for example, the estimated width dimension La', and in particular, may be set to a smaller value as the estimated width dimension La' is larger. Moreover, instead of multiplying the threshold value ΔLs by the coefficient α, a threshold value table for thin paper, which is different from the aforementioned threshold value table, may be provided in advance, and the threshold value ΔLs' (=α*ΔLs) for thin paper organized in this threshold value table for thin paper may be applied.

Third Embodiment

Next, a third embodiment of the present invention will be described.

In the present third embodiment, the aforementioned threshold value ΔLs is set on the basis of the thickness of the document 100, and in particular, as an alternative to the threshold value ΔLs, a thickness adaptive threshold value β*ΔLs (where the threshold value ΔLs is multiplied by a predetermined coefficient β) is applied.

Figure 16:
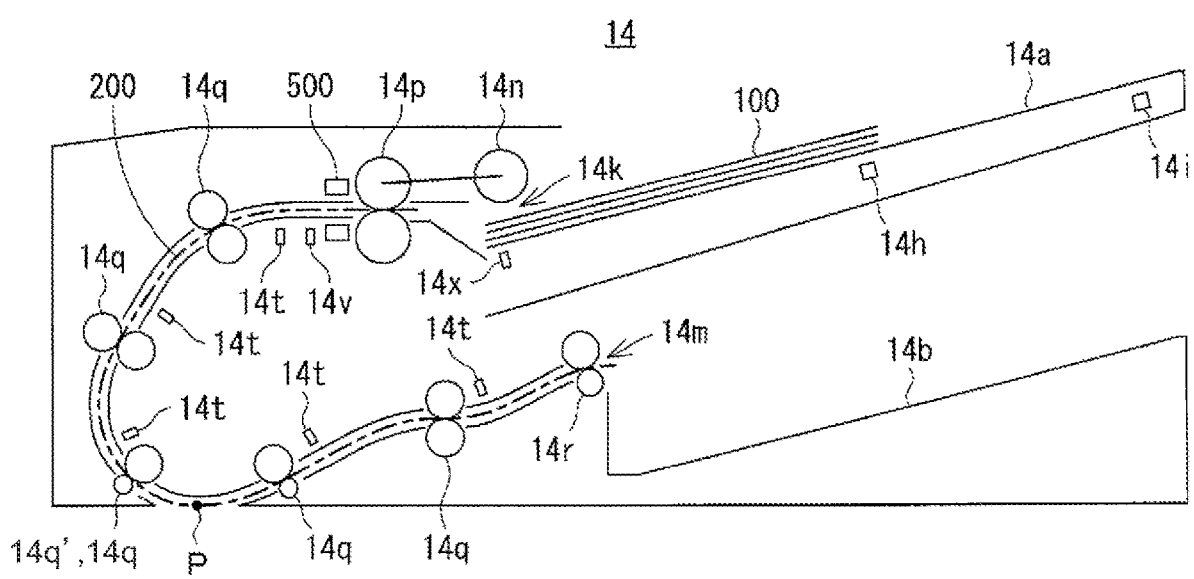
FIG. 16 is a diagram schematically illustrating an internal structure of an automatic document feeder in a third embodiment of the present invention.

Specifically, in the present third embodiment, as illustrated in FIG. 16, a multi feed sensor 500 is provided in the middle of the document conveyance path 200, at an appropriate position upstream in the document conveyance path 200, for example, at a position between the respective tilt sensors 14v and 14v and the paper feed roller 14p. This multi feed sensor 500 is an example of an multi feed detector that uses ultrasonic waves to detect whether the document 100 is being multi-fed, that is, whether a plurality of documents 100 are being conveyed in an overlapped state. In addition, the multi feed sensor 500 also functions as an example of a thickness detector that detects the thickness of the document 100. The multi feed sensor 500 includes a transmitter that emits ultrasonic waves (the element indicated by the upper rectangle in FIG. 16) and a receiver that receives the ultrasonic waves (the element indicated by the lower rectangle in FIG. 16). These transmitter and receiver are provided with the document conveyance path 200 sandwiched therebetween.

Then, in the present third embodiment, the value of the coefficient β is changed as appropriate on the basis of the detection result by the multi feed sensor 500, in particular on the basis of the detection result of the thickness of the document 100. The value of this coefficient β is, for example, a value with an upper limit of 1, which is larger than 0 ($0<\beta\leq1$) and smaller as the thickness of the document 100 is smaller. In other words, the smaller the thickness of the document 100 is, the smaller the thickness adaptive threshold value β*ΔLs becomes, that is, the criteria for determining whether to stop the conveyance of the document 100 are more stringent. Even in a case where the thickness of the document 100 changes, this ensures that the document 100 is conveyed efficiently without being stopped unnecessarily, while avoiding damage to the document 100 by the document 100 being caught on the side edges of the document conveyance path 200.

The coefficient β may be changed not only in accordance with the detection result (thickness of the document 100) by the multi feed sensor 500, but also in accordance with the estimated width dimension La'. For example, the coefficient β may be an even smaller value as the estimated width dimension La' is larger. Moreover, instead of multiplying the threshold value ΔLs by the coefficient β, a thickness adaptive threshold value table, which is different from the aforementioned threshold value table, may be provided in advance, and the thickness adaptive threshold value ΔLs" (=β*ΔLs) organized in this thickness adaptive threshold value table may be applied. Additionally, as an alternative to the multi feed sensor 500, another sensor may be employed as the thickness detector.

Other Application Example

Each of the above embodiments is a specific example of the present invention and does not limit the technical scope of the present invention. The present invention is applicable to aspects other than these embodiments.

For example, as for the aforementioned positional deviation maximum value ΔLmax, a value of 7 mm has been illustrated as an example. However, this value is a so-called empirical value, and the positional deviation maximum value ΔLmax is not limited to the value of 7 mm.

Moreover, the aforementioned distance D has been set to 70 mm, but is not limited to this value. The distance D is determined appropriately in accordance with the minimum size of the document 100 as described above.

Moreover, the threshold value ΔLs may be set on the basis of a length dimension which is a dimension in the conveyance direction of the document 100, in addition to the width dimension La (estimated width dimension La') of the document 100. In this case, it is preferable to set the threshold value ΔLs to be smaller as the length dimension of the document 100 is larger.

In addition, as an alternative to the threshold value ΔLs, that is, as an alternative to the threshold value ΔLs for the positional deviation ΔLd, for example, a threshold value ΔTs for the time deviation ΔTd may be employed. In other words, the conveyance of the document 100 may be stopped when the time deviation ΔTd is greater than the threshold value ΔTs ($\Delta Td > \Delta Ts$). In addition, for example, the conveyance of the document 100 may be stopped when the tilt angle θ is detected and the tilt angle θ is larger than a threshold value θs for the tilt angle θ ($\theta > \theta s$). In other words, a configuration may be preferably employed in which when some value indicating the tilt degree of the document 100 is detected and this value is larger than a predetermined threshold value, the conveyance of the document 100 is stopped.

Furthermore, the tilt detector 14w as an example of the tilt degree detector has been configured with the two tilt sensors 14v and 14v, but may be configured with three or more tilt sensors 14v, 14v, . . . . In other words, the configuration may be such that the tilt degree of the document 100 is detected on the basis of the output signal of each of the three or more tilt sensors 14v, 14v, . . . . Moreover, the reflective optical sensor has been employed as the respective tilt sensors 14v, but the respective tilt sensors 14v are not limited to this, and a transmissive optical sensor or a suitable sensor other than an optical sensor may be employed.

Additionally, with regard to the estimated width dimension La', the minimum value of the detection result by the guide width detector 14e (guide width) and the specified value of the width dimension La based on the detection result by the document size detection function (document size) has been identified as the estimated width dimension La', but the estimated width dimension La' is not limited to this. For example, the estimated width dimension La' may be identified on the basis of only one of the detection result by the guide width detector 14e and the specified value of the width dimension La based on the detection result by the document size detection function.

Moreover, as an alternative to the guide width detector 14e, an alternative component for detecting the width dimension La of the document 100 may be provided. As the alternative component, for example, a configuration may be employed in which a plurality of optical sensors are arranged at appropriate intervals along the conveyance width direction at a position close to the paper feed slot 14k in the document placement tray 14a, and the width dimension La of the document 100 may be detected (roughly) on the basis of the output signal of each of these plurality of sensors.

In addition, the document size document size detection function has been implemented by, but not limited to, the CPU 24a, the guide width detector 14e, and the document length detector 14j. For example, the aforementioned alternative component for detecting the width dimension La of the document 100 may be employed as an alternative to the guide width detector 14e. In other words, the document size detection function may be implemented by the CPU 24*a*, the alternative component mentioned here, and the document length detector 14*j*.

Moreover, in each of the embodiments, the case where the present invention is applied to the automatic document feeder 14 attached to a multifunction peripheral 10 has been described, but the present invention is not limited to this. For example, the present invention can be applied to an automatic document feeder attached to a copy-only machine or an image-scanner-only machine. In extreme cases where an automatic document feeder is capable of operating on its own, the present invention can also be applied to this stand-alone automatic document feeder. Furthermore, the present invention can be applied not only to the automatic document feeder but also to the manual feed tray 20*b* (see FIG. 11).

Additionally, the present invention can be provided not only in the form of a device that is a paper conveyance device such as the automatic document feeder 14, but also in the form of a program that is a control program of the paper conveyance device, and in the form of a method that is a control method of the paper conveyance device.

In addition, the present invention can also be provided in the form of a computer-readable recording medium on which a control program of a paper conveyance device is recorded. The recording medium referred to here is, for example, a semiconductor medium such as a SD memory card and a USB memory, or disk medium such as a CD and a DVD. Not only these portable storage media, but also device embedded (built-in) storage media such as a ROM, a hard disk drive, and the like are applicable as the recording medium referred to herein.

What is claimed is:

1. A paper conveyance device that takes in paper placed on a placement section into a conveyance path in units of one sheet and conveys the paper along the conveyance path, the paper conveyance device comprising:
   a width dimension detector that detects a width dimension which is a dimension in a direction perpendicular to a conveyance direction of the paper placed on the placement section;
   a tilt degree detector that detects a tilt degree of the paper being conveyed along the conveyance path, with respect to a basic posture of the paper;
   a stopper that stops conveyance of the paper when a result of detection by the tilt degree detector exceeds a threshold value; and
   a threshold value setter that sets the threshold value on a basis of a result of detection by the width dimension detector,
   wherein the paper is a document, and
   wherein an image reading position for an image reader to read an image of the document is arranged in a middle of the conveyance path.

2. The paper conveyance device according to claim 1, further comprising a size detector that detects a size of the paper placed on the placement section,
   wherein the width dimension detector detects the width dimension on a basis of a result of detection by the size detector.

3. The paper conveyance device according to claim 1, further comprising: a regulator that regulates positions of both side edges of the paper in the direction perpendicular to the conveyance direction of the paper placed on the placement section; and
   a regulated position detector that detects a position regulated by the regulator, and
   wherein the width dimension detector detects the width dimension on a basis of a result of detection by the regulated position detector.

4. The paper conveyance device according to claim 1, further comprising a user operation acceptor that accepts a user operation indicating that the paper is thin paper,
   wherein the threshold value setter sets the threshold value on a basis of whether the user operation has been accepted by the user operation acceptor in addition to the result of detection by the width dimension detector.

5. The paper conveyance device according to claim 1, further comprising a thickness detector that detects a thickness of the paper,
   wherein the threshold value setter sets the threshold value on a basis of a result of detection by the thickness detector in addition to the result of detection by the width dimension detector.

6. An image reading apparatus comprising:
   the paper conveyance device according to claim 1; and
   the image reader.

7. A non-transitory computer-readable storage medium storing control program for a paper conveyance device that takes in paper placed on a placement section into a conveyance path in units of one sheet and conveys the paper along the conveyance path, the control program causing a computer of the paper conveyance device to perform:
   a width dimension detection procedure that detects a width dimension which is a dimension in a direction perpendicular to a conveyance direction of the paper placed on the placement section;
   a tilt degree detection procedure that detects a tilt degree of the paper being conveyed along the conveyance path, with respect to a basic posture of the paper;
   a stop procedure that stops conveyance of the paper when a result of detection by the tilt degree detector exceeds a threshold value; and
   a threshold value setting procedure that sets the threshold value on a basis of a result of detection by the width dimension detector,
   wherein the paper is a document, and
   wherein an image reading position for an image reader to read an image of the document is arranged in a middle of the conveyance path.

8. A control method for a paper conveyance device that takes in paper placed on a placement section into a conveyance path in units of one sheet and conveys the paper along the conveyance path, the control method comprising:
   detecting a width dimension which is a dimension in a direction perpendicular to a conveyance direction of the paper placed on the placement section;
   detecting a tilt degree of the paper being conveyed along the conveyance path, with respect to a basic posture of the paper;
   stopping conveyance of the paper when a result of detection by the tilt degree detector exceeds a threshold value; and
   setting the threshold value on a basis of a result of detection by the width dimension detector,
   wherein the paper is a document, and
   wherein an image reading position for an image reader to read an image of the document is arranged in a middle of the conveyance path.

\* \* \* \* \*